(12) United States Patent
Redmond

(10) Patent No.: US 6,648,784 B2
(45) Date of Patent: Nov. 18, 2003

(54) IDLER SPROCKET

(75) Inventor: John D. Redmond, Littleton, CO (US)

(73) Assignee: The Gates Corporation, Denver, CO (US)

( * ) Notice: Subject to any disclaimer, the term of this patent is extended or adjusted under 35 U.S.C. 154(b) by 5 days.

(21) Appl. No.: 10/008,460

(22) Filed: Nov. 30, 2001

(65) Prior Publication Data

US 2003/0104889 A1 Jun. 5, 2003

(51) Int. Cl.⁷ .................................................. F16H 7/02
(52) U.S. Cl. ............................................. 474/153; 474/204
(58) Field of Search ................................... 474/205, 153, 474/152, 202, 204

(56) References Cited

U.S. PATENT DOCUMENTS

| | | | | |
|---|---|---|---|---|
| 3,583,250 A | * | 6/1971 | Kongelka | 474/133 |
| 3,738,187 A | * | 6/1973 | Hisserich | 474/148 |
| 4,047,444 A | * | 9/1977 | Jeffrey | 474/148 |
| RE30,440 E | * | 12/1980 | Jeffrey | 474/148 |
| 4,295,837 A | * | 10/1981 | Marsh | 474/153 |
| 4,427,403 A | | 1/1984 | Kanamori et al. | 474/153 |
| 4,452,594 A | * | 6/1984 | Patterson | 474/153 |
| 4,468,211 A | * | 8/1984 | Hoshiro et al. | 474/205 |
| 4,604,080 A | | 8/1986 | Mizuno | 474/153 |
| 4,605,389 A | | 8/1986 | Westhoff | 474/153 |
| 5,417,617 A | | 5/1995 | Milton | 474/93 |
| 5,984,816 A | * | 11/1999 | Nishio et al. | 474/153 |

FOREIGN PATENT DOCUMENTS

JP       11051128 A       2/1999       ............. F16H/7/02

* cited by examiner

Primary Examiner—David Fenstermacher
(74) Attorney, Agent, or Firm—J. A. Thurnau, Esq.; C. H. Castleman, Esq.; S. G. Austin, Esq.

(57) ABSTRACT

A belt drive system and toothed idler sprocket having an arcuate pitch to significantly reduce noise. The toothed idler sprocket having a pitch sufficient to cause proper engagement between a belt and the sprocket at a minimal belt wrap angle.

9 Claims, 3 Drawing Sheets

IDLER SPROCKET

FIELD OF THE INVENTION

The invention relates to idler sprockets, and more particularly to idler sprockets in a belt drive system.

BACKGROUND OF THE INVENTION

A belt drive system may comprise two or more pulleys with a belt trained between them. The belt may comprise any profile known in the art, including toothed, multi-ribbed or v-belt.

In order to assure proper operation and belt life, a belt tension or preload is applied to the belt. This may be accomplished by simply moving the pulleys slightly apart a predetermined distance. It may also be accomplished by use of a spring loaded tensioner applied to the belt. Another option is to use an adjustable idler sprocket.

In the case of the idler sprocket, the belt tension will be a function of the position of the idler relative to a belt. The idler will also have a belt bearing surface. In the case of an idler sprocket used with synchronous or toothed belts, the idler sprocket belt bearing surface may also comprise teeth. This is particularly the case where the idler sprocket bears on the toothed side of the belt.

During operation the toothed idler sprocket generates noise due to the impact of the sprocket teeth on the belt as the sprocket turns. This noise can be very objectionable.

Representative of the art is Japanese Application No. 09220821 A to Ricoh Co. Ltd which discloses setting a position where each tooth of n (integer of 2 or more) timing belts starts to mesh with a tooth groove of a drive pulley in such a way that it is deviated in the peripheral direction by 1/n of a pitch of a tooth of the drive pulley.

What is needed is a sprocket with significantly reduced operating noise. What is needed is a sprocket having an arcuate pitch that substantially matches the pitch of a belt engaged with a sprocket. What is needed is a sprocket for use with a belt having a minimal wrap angle. The present invention meets these needs.

SUMMARY OF THE INVENTION

The primary aspect of the invention is to provide a sprocket with significantly reduced operating noise.

Another aspect of the invention is to provide a sprocket having an arcuate pitch that substantially matches the pitch of a belt engaged with a sprocket.

Another aspect of the invention is to provide a sprocket for use with a belt having a minimal wrap angle.

Other aspects of the invention will be pointed out or made obvious by the following description of the invention and the accompanying drawings.

The invention comprises a belt drive system and toothed idler sprocket having an arcuate pitch to significantly reduce noise. The toothed idler sprocket having a pitch sufficient to cause proper engagement between a belt and the sprocket at a minimal belt wrap angle.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
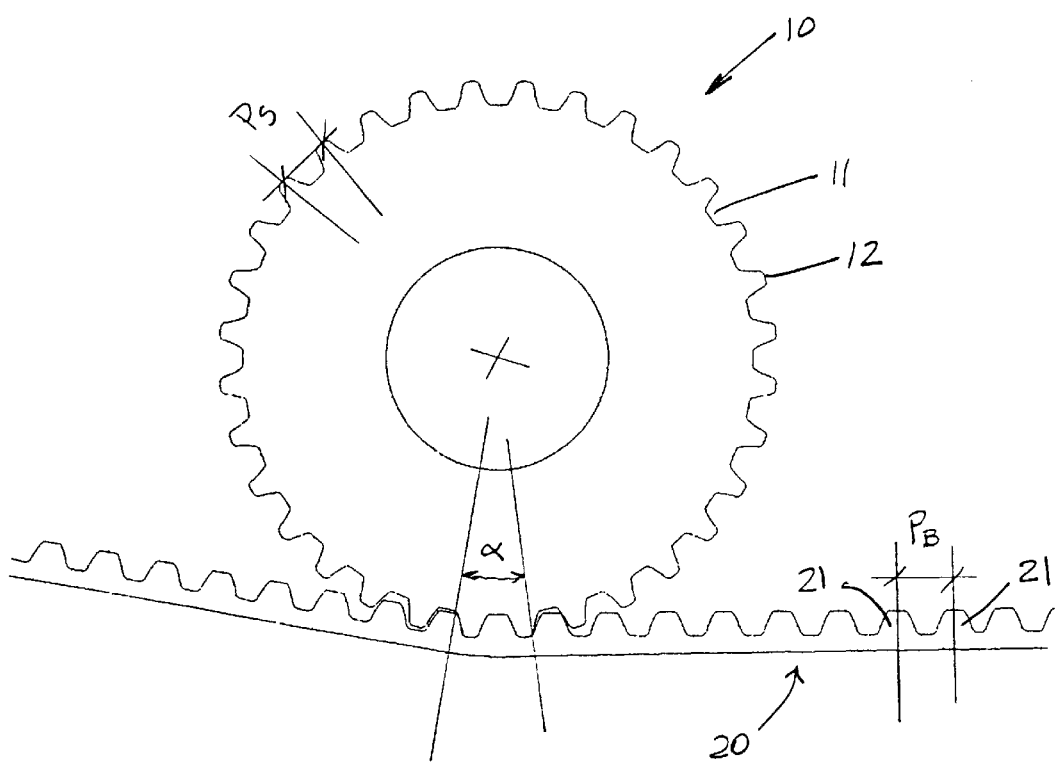
FIG. 1 is a side elevation view of a pulley.

FIG. 1 is a side elevation view of a pulley. Pulley 10 comprises grooves 11 and teeth 12 disposed between grooves 11. Toothed belt 20 engages pulley 10. Pulley 10 may be engaged with any belt span in a belt drive system. Generally, an idler pulley is used to adjust a belt tension in a system.

Referring to FIG. 1, in a belt drive system the pitch $P_B$ of the belt 20 is the distance between centers of adjacent belt teeth 21. The pitch $P_S$ of sprocket 10 is a distance between centers of adjacent sprocket teeth 12 at the surface of each adjacent tooth. To operate properly, a belt is engaged with the pulley about a portion of the circumference of the pulley, also referred to as a wrap angle.

In the case of a standard pulley/belt system, to achieve the proper wrap angle it is necessary for a sprocket tooth pitch $P_S$ to be slightly less than a belt tooth pitch $P_B$, or put another way, for a sprocket pitch line diameter to be equal to a belt pitch line diameter. The pitch line is generally at the location of the belt tensile cord. The pitch line is usually represented by a reference arc disposed some distance above a sprocket tooth surface.

Another value used in the art is the pitch line differential or "PLD". It is generally the difference between a belt pitch line location, or sprocket pitch diameter (PD), and a sprocket outside diameter ("OD"). In other words:

$$PD-OD=PLD$$

The OD is measured at a sprocket outer tooth surface. For example, the OD for an 8MM-28 tooth sprocket may be 2.744", which will result in a sprocket pitch diameter ("PD") of 2.807". In this case the PLD of 0.063" allows the belt teeth having a pitch of 8.0 MM to properly mesh with the sprocket teeth about a wrap angle.

In the prior art, idlers used with toothed belt drive systems are cut using the PLD method. This means a prior art idler will properly mesh with a belt for a significant wrap angle. It also means the sprocket teeth will impact each belt land. Contrary to a prior art sprocket, a belt will not properly engage an inventive sprocket over any significant wrap angle, as is described more fully herein.

More particularly, in most idler applications where a toothed side of a belt is engaged, the wrap angle α is generally less than 30°. This means the belt is substantially in rack form, i.e., flat, as the sprocket engages the belt. For example, two matched tooth profiles when properly engaged in rack form will have exactly the same pitch. However, any difference in pitch between the profiles, as is necessary for PLD design, will cause the profiles to be slightly mismatched in rack form. This results in unacceptable clearances between a belt tooth flank and a sprocket groove. Movement of the belt within these clearances also contributes to operational noise, as is the case on an internal combustion engine. In this disclosure "angle of wrap" and "wrap angle" may be used interchangeably and have the same meaning.

Between adjacent sprocket teeth is a groove which comprises a groove depth. The depth is chosen to assure proper engagement of a belt tooth with a pulley groove, which then ensures maximum power transmission. Each pulley tooth engages a land between each belt tooth. During operation, the impact of each sprocket tooth with a belt land causes noise to be generated. The intensity of the noise is a function of various factors, including the height of the tooth as compared to the depth of the land.

The inventive sprocket significantly reduces operating noise with a belt in a substantially "rack", or flat, position, and at low wrap angels, because the pitch of the sprocket substantially matches the pitch of the belt at the mating interface. For example an 8.0 mm pitch belt in rack has a tooth-to-tooth spacing of 8.0 mm. Consequently, to achieve a low noise condition the tooth-to-tooth spacing ("arcuate pitch") of the sprocket must also be 8.0 mm. This "mesh at rack" is applicable if no more than one sprocket tooth is in contact with the belt in a true rack position.

In an application with measurable belt span deflection and more than one belt tooth in contact with the sprocket, the sprocket "mesh at rack" OD must be reduced by an appropriate amount to maintain proper meshing between the sprocket teeth and the belt grooves.

The following formula is used to determine the adjusted OD ("Ad") of an inventive sprocket in a system where a belt span is deflected away from a rack position. In addition to the number of teeth on the sprocket, two things must be known, the PLD for a "standard" sprocket having the same number of teeth, and the amount of belt wrap on the sprocket during operation of the system. The number of teeth and PLD are available in sprocket specification tables of various product catalogues. The wrap angle may also be calculated using methods known in the art.

Therefore, $$Ad=Sd-(PLDd \times BWd)$$

Where:
PLD=Pitch line differential
BWd=Belt wrap in degrees
Sd=Sprocket outside diameter for belt rack pitch mesh.
Ad=Adjusted sprocket outside diameter
PLDd=PLD/360°
A sample calculation for a 5° angle of wrap for a "8MM"-28 tooth sprocket follows:
PLD=0.063"
BWd=5°
Sd=2.807"
PLDd=0.00018"/°
Therefore;

$$Ad=2.807"-(0.00018"/° \times 5°)=2.806"$$

For a system having a 5° angle of wrap, Ad=2.806". This can be compared to a "standard" OD of 2.744". The inventive sprocket has an OD that is 0.062" greater than a standard sprocket. The number of teeth remains at 28. One can appreciate that this calculation is applicable to a sprocket having any number of teeth.

Continuing, given that Ad=2.806" the pitch of the inventive sprocket for a 5° angle of wrap is:

Inventive Pitch=π(2.806")/28=0.3148" or 7.9959 mm

This compares to the pitch of a standard sprocket of:

Standard Pitch=π(2.744")/28=0.3079" or 7.8206 mm

The difference in pitch between the standard sprocket and the inventive sprocket is 0.0069" or 0.1753 mm. This illustrates that the inventive sprocket has a greater pitch than a standard sprocket at a low wrap angle, thereby enhancing engagement between the sprocket and belt. Put another way, the sprocket pitch is inversely proportional to an angle of wrap, that is, as an angle of wrap decreases a sprocket pitch increases. One skilled in the art can also see that as the wrap angle approaches zero, a sprocket pitch will substantially equate to a rack pitch of a belt to which it is engaged. This further illustrates that the inventive sprocket significantly reduces or eliminates the mismatch between a sprocket profile and a belt profile otherwise included in sprocket idler systems, thereby reducing or eliminating noise caused by such mismatch.

Although the inventive sprocket is readily applicable to low angles of wrap, for example under 5°, the method may be applied to any idler situation having a particular wrap angle and requiring a precise engagement between the idler sprocket and a belt, up to and including a 180° wrap angle.

For further noise reduction, the sprocket groove profile can be a mirror image of the belt tooth profile eliminating noisy backlash in drives with rotational velocity variations, for example in an internal combustion engine. Reducing the sprocket groove depth also enhances the acoustic signature. This creates land area clearance at the belt/sprocket interface, thereby reducing the sound pressure level.

Consequently, the instant invention is an improvement on many prior art problems. The advantages of the inventive sprocket and system are many. First, the teeth of the sprocket properly engage each belt tooth surface more fully and precisely than in the case of a standard PLD sprocket. Second, a sprocket tooth height can be reduced as compared to a belt groove depth in order to assure proper full engagement between a belt tooth flank and a sprocket groove. Third, the sprocket teeth engage each belt tooth in a proper form reflecting the specific wrap angle instead of a generic PLD form. Fourth, the improved sprocket/belt engagement results in significantly reduced noise generated during operation of the belt drive system due to reduced contact between a sprocket tooth and a belt land. Fifth, the clearances between a sprocket groove and a belt tooth is significantly reduced and therefore noise caused by relative movement between the sprocket and the belt is reduced.

For example, in the instant invention a groove profile extending in a longitudinal direction may be substantially shaped in a tractrix curve as disclosed in U.S. Pat. No. 4,605,389 to Westhoff, incorporated herein by reference. Although the groove profile of this embodiment comprises a tractrix curve, the usefulness of the invention is not limited to a single tooth profile. The groove profile may also comprise any other tooth profile as may be used in the art on a toothed belt, so long as the inventive idler sprocket has a profile to cooperatively engage a belt profile.

Figure 3:
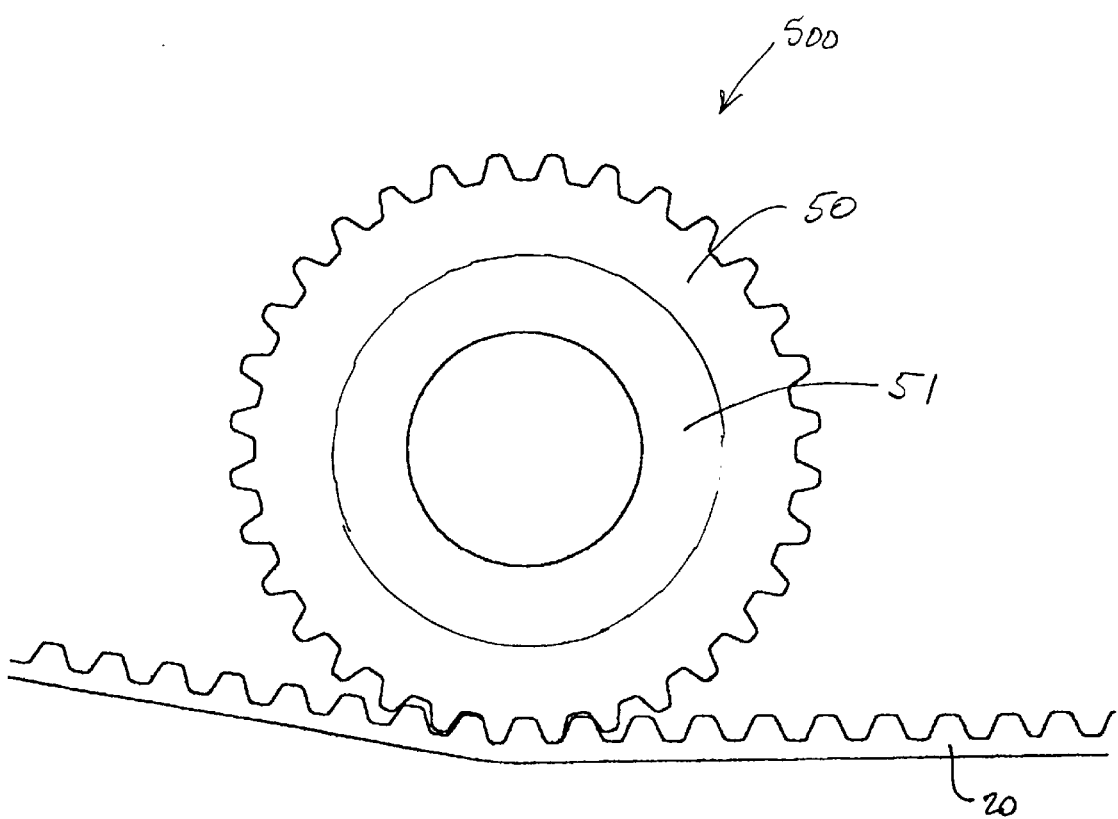
FIG. 3 is another embodiment of the inventive idler.

In another embodiment shown in FIG. 3, an outer perimeter of the inventive sprocket 500 comprises a resilient material 50, such as elastomeric material including natural and synthetic rubbers. The hub portion 51 comprises a non-compressible material such as metal. Compressible portion 50 is bonded to hub portion 51 by adhesives known in the art. The resilient material dampens vibrations caused by engagement of the belt with the sprocket during operation.

Figure 2:
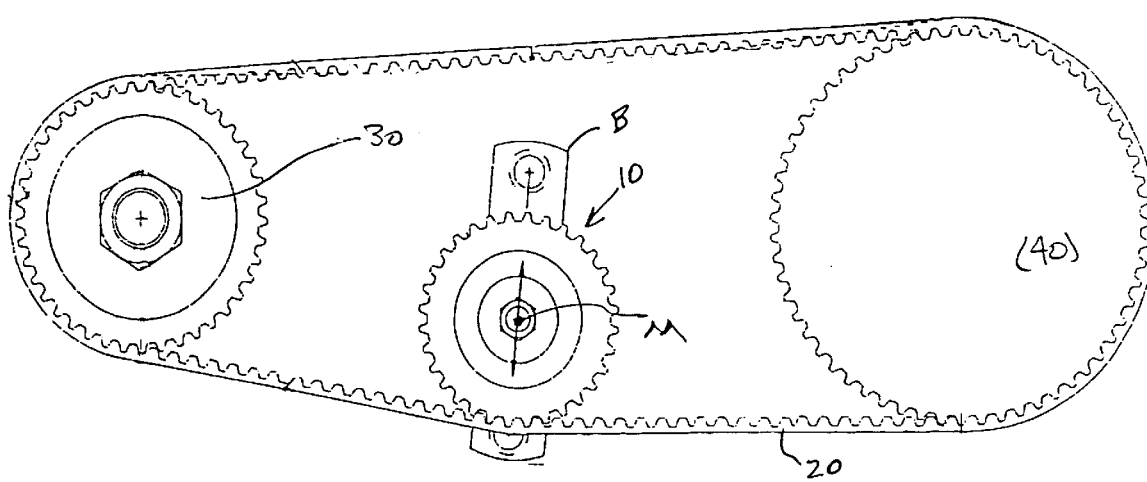
FIG. 2 is a side elevation view of a two pulley drive system including the inventive idler.

FIG. 2 is a side elevation view of a two pulley drive system including the inventive idler. Idler pulley 10 is shown engaged with a belt span between a driver pulley 30 and a driven pulley 40. The wrap angle is less than approximately 72°. The wrap angle may be as minimal as may be necessary to allow a single sprocket tooth to engage a belt. Of course, the wrap angle may exceed 72° as may be required by a system configuration. Pulley 10 is adjustable by a movement M on a bracket B.

Although a single form of the invention has been described herein, it will be obvious to those skilled in the art that variations may be made in the construction and relation of parts without departing from the spirit and scope of the invention described herein.

I claim:

1. A belt drive system comprising;
   a toothed belt having a pitch, the belt trained between at least two sprockets;
   a third idler sprocket disposed between the two sprockets having a pitch, the third idler sprocket engaged with a belt toothed surface;
   the belt having an angle of wrap between 5° and 0° about the third idler sprocket; and
   the third idler sprocket pitch determined by the angle of wrap.

2. The belt drive system as in claim 1, wherein a third idler sprocket noise is significantly reduced.

3. The belt drive system as in claim 1 wherein a belt tooth profile in a longitudinal direction is substantially shaped as a tractrix curve.

4. The system according to claim 1, wherein the pitch is substantially equal to the belt pitch as the belt wrap angle approaches zero.

5. The belt drive system as in claim 1, wherein a belt groove has a depth equal to or greater than a pulley tooth height.

6. A sprocket having a plurality of teeth on a cylindrical surface, the teeth having a pitch, the improvement comprising:
   the pitch determined to substantially engage a belt in rack form; and
   a belt tooth pitch greater than a sprocket tooth pitch.

7. The sprocket as in claim 6, wherein:
   the pitch is calculated by the equation $$\pi(Ad)/(\text{Sprocket number of teeth}); \text{ and}$$

wherein Ad is calculated by the equation $$Sd-(PLDd \times BWd).$$

8. A sprocket having a plurality of teeth on a cylindrical surface, the teeth having a pitch, the improvement comprising:
   the pitch greater than a belt rack form pitch to minimize a belt noise.

9. An idler sprocket for engaging. a toothed belt comprising:
   a plurality of teeth having a pitch;
   the pitch is substantially equal to or less than a belt pitch for engaging a belt in a rack form and having a belt wrap angle in the range of 0° to 5°;
   the pitch is calculated by the equation $\pi(Ad)/(\text{sprocket number of teeth})$; and
   wherein Ad is calculated by the equation $Sd-(PLDd \times BWd)$.

* * * * *